United States Patent
Gandhi

(10) Patent No.: US 8,596,802 B2
(45) Date of Patent: Dec. 3, 2013

(54) ADJUSTABLE REFLECTOR FOR DIRECTING ENERGY TO A RECEIVER

(75) Inventor: Umesh N. Gandhi, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 196 days.

(21) Appl. No.: 13/105,812

(22) Filed: May 11, 2011

(65) Prior Publication Data

US 2012/0285443 A1  Nov. 15, 2012

(51) Int. Cl.
  *G02B 5/08* (2006.01)
  *G02B 7/182* (2006.01)
(52) U.S. Cl.
  USPC .......................... 359/846; 359/849; 359/871
(58) Field of Classification Search
  None
  See application file for complete search history.

(56) References Cited

U.S. PATENT DOCUMENTS

| | | |
|---|---|---|
| 4,056,309 A | 11/1977 | Harbison et al. |
| 4,115,177 A | 9/1978 | Nelson |
| 4,124,277 A | 11/1978 | Stang |
| 4,162,825 A | 7/1979 | Dowty |
| 4,243,301 A | 1/1981 | Powell |
| 4,318,394 A | 3/1982 | Alexander |
| 4,337,997 A | 7/1982 | Sadoune et al. |
| 4,340,031 A | 7/1982 | Niedermeyer |
| 4,343,533 A | 8/1982 | Currin et al. |
| 4,432,345 A | 2/1984 | McIntire |
| 4,469,089 A | 9/1984 | Sorko-Ram |
| 4,487,196 A | 12/1984 | Murphy |
| 4,493,313 A | 1/1985 | Eaton |
| 4,515,148 A | 5/1985 | Boy-Marcotte et al. |
| 4,571,812 A | 2/1986 | Gee |
| 4,597,377 A | 7/1986 | Melamed |
| 4,731,617 A | 3/1988 | Gray et al. |
| 6,363,928 B1 | 4/2002 | Anderson, Jr. |
| 7,156,531 B2 | 1/2007 | Rudi |
| 7,309,398 B2 | 12/2007 | Blackmon et al. |
| 2003/0183221 A1 | 10/2003 | Karnaukhov et al. |
| 2007/0221313 A1 | 9/2007 | Franck et al. |
| 2007/0223096 A1 | 9/2007 | O'Connor et al. |
| 2009/0211569 A1 | 8/2009 | Garcia-Conde Noriega et al. |
| 2009/0260620 A1 | 10/2009 | Winger et al. |
| 2009/0314280 A1 | 12/2009 | Banerjee |
| 2010/0170560 A1 | 7/2010 | Sapienza et al. |
| 2010/0199972 A1 | 8/2010 | Brost |
| 2010/0263709 A1 | 10/2010 | Norman et al. |
| 2010/0282295 A1 | 11/2010 | Gomery |
| 2011/0000522 A1 | 1/2011 | Bender |

FOREIGN PATENT DOCUMENTS

| | | |
|---|---|---|
| CH | 571199 | 11/1975 |
| CN | 101697030 | 4/2010 |
| GB | 2042761 | 9/1980 |
| WO | WO 03/022578 | 3/2003 |

*Primary Examiner* — Jade R Chwasz
(74) *Attorney, Agent, or Firm* — Snell & Wilmer LLP

(57) ABSTRACT

A low-cost and easy-to-operate solution for adjusting the curvature and the focal length of an adjustable reflector, which includes a curved plate, a rotation member, and a contour adjustor. The curved plate has a curvature. The rotation member engages the curved plate and rotates the curved plate about an axis and to an angular position. The contour adjustor has an adjustment surface contacting the curved plate, such that it may cooperate with the rotation member to adjust the curvature of the curved plate according to the angular position of the curved plate. Advantageously, the contour adjustor has a low manufacturing cost and a low installation cost. The contour adjustor operates without relying on additional control circuitry because it may perform its intended function while the curved plate is being rotated.

19 Claims, 8 Drawing Sheets

ADJUSTABLE REFLECTOR FOR DIRECTING ENERGY TO A RECEIVER

BACKGROUND

1. Field

The present invention generally relates to the field of heliostats, and more particularly to low cost adjustable reflectors for directing energy to a receiver.

2. Description of the Related Art

In a solar energy conversion system, a group of conventional heliostats may be used for collecting and redirecting solar energy. The conventional heliostat includes a conventional curved reflector, which may be pivoted as the relative position between the sun and the conventional heliostat changes. Such a pivot movement may redirect the energy from the sun onto a focal point. The focal point may overlap with a target, such as a receiver positioned on top of a solar tower. The energy redirected from the conventional heliostat is then collected at the receiver and converted into usable energy, which can be stored for later use.

The conventional curved reflector usually only pivots in response to the relative position of the sun. This can be problematic because as the relative position changes, the focal point of the conventional curved reflector may change as well. Because the relative position of the sun may change the focal point of the conventional curved plate, the energy redirected therefrom may or may not reach the receiver of the solar tower.

Attempts have been made in the past to provide control apparatuses for controlling the focal length of the conventional curved reflector. However, these control apparatuses often involves expensive material and/or complicated control electronics. Because a typical solar power conversion system may deploy a large number of heliostats, the cost of installing and operating these control apparatuses may be impermissibly high. Thus, there is a need for a low cost adjustable reflector for use in a solar power conversion system and/or other similar power redirecting systems.

SUMMARY

The present invention may provide a low-cost and easy-to-operate solution for adjusting a curvature and a focal length of a curved reflector. This solution may involve using a contour adjustor for adjusting the curvature and the focal length of the curved reflector. The contour adjustor may have a low manufacturing cost and a low installation cost. Because the contour adjustor may perform its intended function while the curved plate is being pivoted, it may operate without relying on additional control circuitry.

In one embodiment, the present invention may provide an adjustable reflector, which may include a curved plate having a curvature, a rotation member engaging the curved plate, and configured to rotate the curved plate about an axis and to an angular position, and a contour adjustor having an adjustment surface contacting the curved plate, the contour adjustor cooperating with the rotation member to adjust the curvature of the curved plate according to the angular position of the curved plate.

In another embodiment, the present invention may provide an adjustable reflector for directing energy to a receiver. The adjustable reflector may include a parabolic plate having a focal length and an edge defining a first plane, a rotation member defining a second plane, the rotation member engaging the parabolic plate, and configured to angularly displace the parabolic plate, such that the first plane forms an angle with the second plane, and a contour shaft positioned substantially perpendicular to the second plane, and having a contact surface for contacting the parabolic plate, the contour shaft cooperating with the rotation member to adjust the focal length of the parabolic plate according to the angle between the first plane and the second plane.

In yet another embodiment, the present invention may provide a heliostat for directing solar energy to a tower receiver. The heliostat may include a pole having a first end mounted to a rigid surface, a second end opposing the first end, and a middle segment positioned between the first end and the second end, a hinge positioned at the second end of the pole, and defining an axis substantially perpendicular to the pole, a parabolic dish having a concave surface and a convex surface defining a curvature therebetween, the parabolic dish engaging the hinge for rotating about the axis to form a displacement angle with a reference plane substantially perpendicular to the pole, and a contour adjustment surface positioned along the middle segment of the pole and facing the convex surface of the parabolic dish, the adjustment surface cooperating with the hinge to adjust the curvature of the curved plate based on the displacement angle.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Apparatus, systems and methods that implement the embodiment of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between reference elements. In addition, the first digit of each reference number indicates the figure in which the element first appears.

Figure 1:
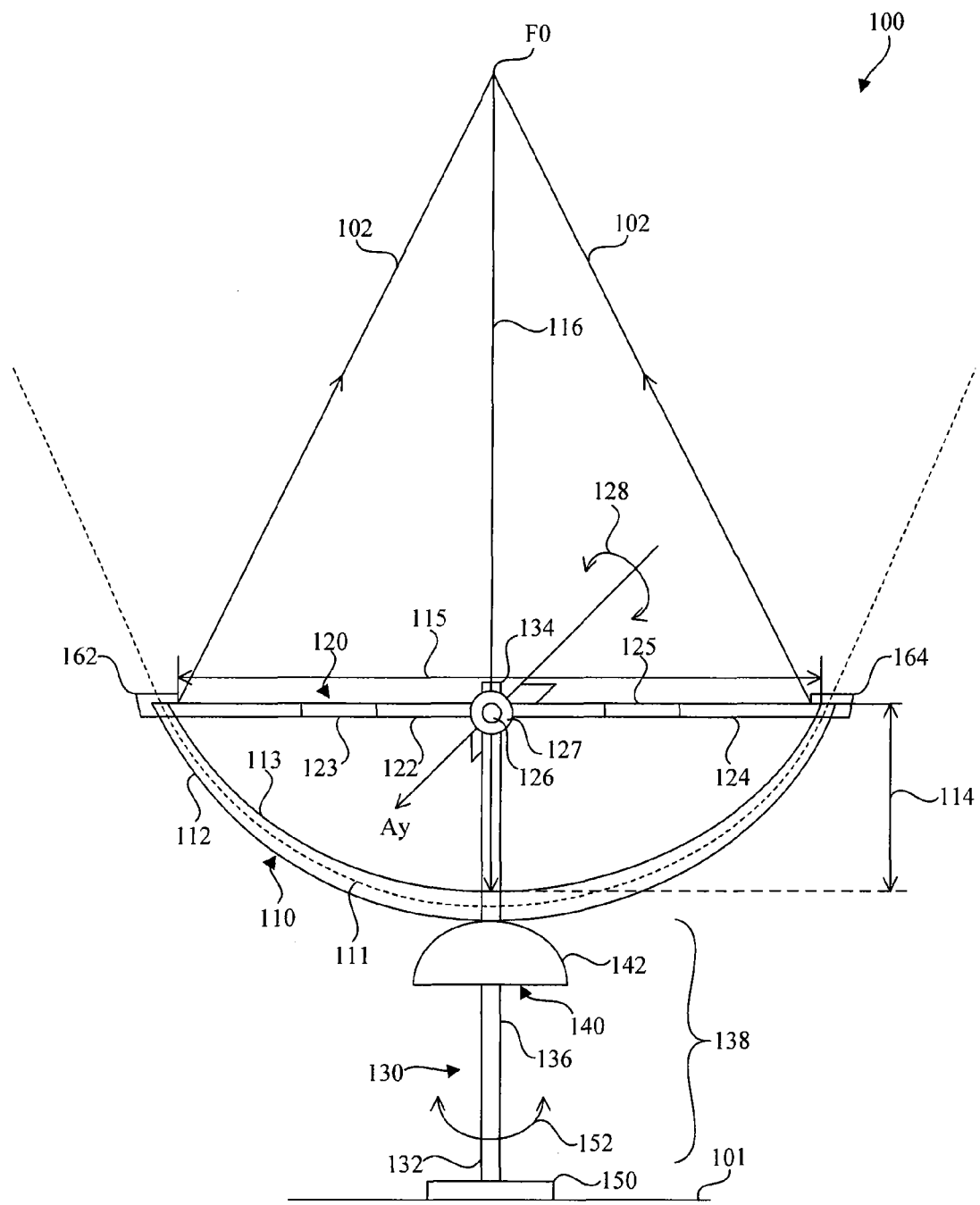
FIG. 1 shows a cross-sectional view of an adjustable reflector according to an embodiment of the present invention.

FIG. 1 shows a cross-sectional view of an adjustable reflector 100 according to an embodiment of the present invention. Generally, the adjustable reflector 100 may be used for directing various types of waves, such as light waves, sound waves, and/or electromagnetic waves, to a focal point. In one application, the adjustable reflector 100 may be deployed as a heliostat in a solar energy collection system, which may be used for collecting, converting, and storing solar energy. The solar energy collection system may include a solar tower, a receiver mounted on top of a solar tower, and a plurality of adjustable reflectors 100. The plurality of adjustable reflectors 100 may be positioned around the solar tower, so that they may redirect sun light (solar energy) to the receiver.

The adjustable reflector 100 may include various components, which may include but are not limited to a curved plate 110, a rotation member 120, a pole 130, and a contour adjustor 140. The curved plate 110 may have a convex surface 112 and a concave surface 113. At its initial position, the convex surface 112 and the concave surface 113 may define a curvature 111 therebetween. The curvature 111 may have many shapes, such as a circular shape and/or a parabolic shape. When the curvature 111 has a parabolic shape, the curved plate 110 may be referred to as a parabolic plate.

The concave surface 113 may be used for receiving and reflecting incident waves (or rays). Because of the curvature 111, the concave surface 113 may redirect and/or concentrate the reflected waves 102 at a focal point F0. The focal point F0 may be a function of the curvature 111 of the curved plate 110. The concave surface 113 may have a focal length 116, which may be defined as a distance between the focal point F0 and the center of the concave surface. The focal length 116 of the concave surface 113 may be adjusted by reforming the curvature 111 of the curved plate 110. The curvature 111 may be represented by a curvature ratio between a curvature height 114 and a curvature width 115. The curvature height 114 may be the perpendicular distance between the edge of the curved plate 110 and the tangent of the center of the concave surface 113. The curvature width 115 may be the span of the edges of the concave surface 113. In generally, the curvature 111 may increase as the curvature ratio increases.

The rotation member 120 may be used for providing a rotation (first rotation) 128 of the curved plate 110 about an axis $A_Y$. The rotation member 120 may be supported by and partially integrated with the pole 130. The pole 130 may have a first end 132, a second end 134, and a middle segment 136. The first end 132 may be mounted to a rigid surface 101, which may be a ground surface and/or a rigid platform surface. In one embodiment, the first end 132 may be mounted to the rigid surface 101 by using a rotary base 150. The rotary base 150 may include one or more rotation mechanisms for providing a rotation (second rotation) 152 of the pole 130 about an axle defined by the pole 130. In another embodiment, the first end 132 may be mounted directly to the rigid surface 101 and without using the rotary base 150.

The second end 134 of the pole 130 may be opposing the first end 132 of the pole 130. Because the second end 134 is erected above the rigid surface, it may provide an anchoring point for the rotation member 120. Particularly, a hinge 126 may be installed at the second end 134. The hinge 126 may be included as an individual component or as a part of the rotation member 120. The rotation member 120 may include a rotation joint 127 for engaging the rotation hinge 126, a first arm 122 extending from one end of the rotation joint 127, and a second arm 124 extending from the other end of the rotation joint 127.

The first arm 122 and the second arm 124 may each have a longitudinal extension and/or a longitudinal retraction along a direction that is defined by the respective first and second arms 122 and 124. In one embodiment, for example, the first arm 122 may include a first adjustable segment 123. The first adjustable segment 123 may allow the first arm 122 to extend and/or retract longitudinally while significantly restricting the lateral movement and bending of the first arm 122. In another embodiment, for example, the second arm 122 may include a second adjustable segment 125. The second adjustable segment 125 may allow the second arm 124 to extend and/or retract longitudinally while significantly restricting the lateral movement and bending of the first arm 122. Although FIG. 1 shows that the rotation member 120 includes both the first adjustable segment 123 and the second adjustable segment 125, the rotation member 120 may include either the first adjustable segment 123 or the second adjustable segment 125 in various alternative embodiments.

In order to engage the rotation member 120 to the curved plate 110, one or more fastening devices and/or mechanisms can be used for connecting the first arm 122 and the second arm 124 to the concave surface 113 of the curved plate 110. In one embodiment, for example, a first clamp 162 may be used for securing the first arm 122 to an edge of the curved plate 110. In another embodiment, for example, a second clamp 164 may be used for securing the second arm 124 to another edge of the curved plate 110.

When the rotation member 120 is actuated, the first arm 122 and the second arm 124 may angularly displace the curved plate 110 from its initial (resting) position to an angular position. Moreover, the rotation member 120 may cooperate with the pole 130 to hold the curved plate 110, so as to maintain a relatively constant distance between the curved plate 110 and the second end 134 of the pole 130.

As such, the curved plate 110 may be stabilized while having a range of angular displacement. In one embodiment, the angular displacement may range from about minus 90 degrees (counter-clockwise direction) to about plus 90 degrees (clockwise direction). In another embodiment, the angular displacement may range from about minus 60 degrees (counter-clockwise direction) to about plus 60 degrees (clockwise direction). In yet another embodiment, the angular displacement may range from about minus 30 degrees (counter-clockwise direction) to about plus 30 degrees (clockwise direction).

The hinge 126 may be a stationary hinge (passive hinge) or a motorized hinge (active hinge). If the hinge 126 is a stationary hinge, the rotation member 120 may include additional components for rotating the curved plate 110. If the hinge 126 is a motorized hinge, it may be used for actuating the rotation member 120. Accordingly, the hinge 126 may include a set of gears for driving the rotation joint 127.

The contour adjustor 140 may be positioned along the middle segment 136 of the pole 130. In one embodiment, the contour adjustor 140 may be an integral part of the pole 130. In another embodiment, the contour adjustor 140 may be installed and/or removable from the pole 130. When attached to the pole 130, the contour adjustor 140 may form a contour shaft 138 with a portion of the pole 130. The contour adjustor 140 may have a contour adjustment surface 142. The contour adjustment surface 142 may face the convex surface 112 of the curved plate 110. When the curved plate 110 is rotated to various angular positions, the contour adjustment surface 142 may become a contact surface for contacting the convex surface 112 of the curved plate 110 at various locations. At each of the contact locations, the contour adjustment surface 142 may assert a compression force against the convex surface 112 of the curved plate 110. The magnitude of the compression force may be dependent on the angular position of the curved plate 110.

Figure 2:
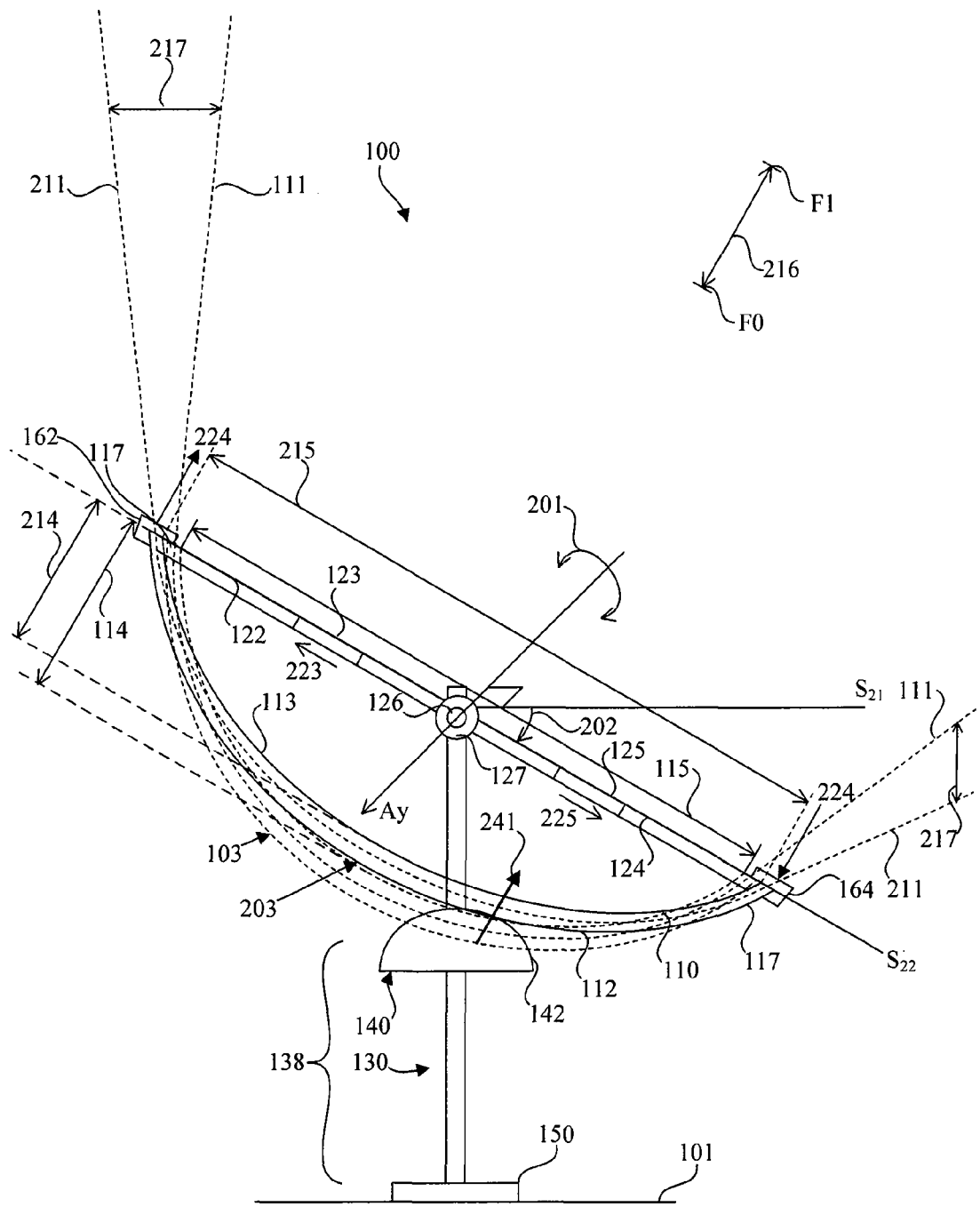
FIG. 2 shows a cross-sectional view of the adjustable reflector at an angular position according to an embodiment of the present invention.

FIG. 2 shows a cross-sectional view of the adjustable reflector 100 at an angular position according to an embodiment of the present invention. The pole 130 and/or the rotation member 120 may define a reference (first) plane S21. The reference plane S21 may be used for measuring and/or determining the angular displacement of the curved plate 110. In one embodiment, the reference plane S21 may be substantially perpendicular to the pole 130. In another embodiment, the reference plane S21 may be substantially parallel to the rigid surface 101. The curved plate 110 may have an edge 117, which may define a displacement plane S22. As discussed herein, the curved plate 110 may be at an initial position when the reference plane S21 overlaps with the displacement plane S22.

The curved plate 110 may be in the initial position before the rotation member 120 is actuated. When the rotation member 120 is actuated, the first arm 122 and the second arm 124 may assert a pair of angular forces 224 against the edges 117 of the curved plate 110. In order to rotate (or angularly displace) the curved plate 110, the pair of angular forces 224 may be in opposite directions. When the curved plate 110 is rotated about the axis $A_y$, the displacement plane S22 may be angularly displaced from the reference plane S21. The angular displacement between the reference plane S21 and the displacement plane S22 may be measured by a displacement angle (or angle) 202.

When the curved plate 110 is angularly displaced, the convex surface 112 of the curved plate 110 may contact the contour adjustment surface 142 of the contour adjustor 140. The contact between the convex surface 112 and the contour adjustment surface 142 may be initially driven by the pair of angular forces 224. As a result, the convex surface 112 may be pressed against the contour adjustment surface 142, thereby asserting a contact force thereto. Because the contour adjustor 140 is supported by the pole 130, the contact force will not laterally or longitudinally displace the contour adjustor 140. Reacting to the contact force, the contour adjustor 140 may assert a compression force 241 against the convex surface 112 of the curved plate 110. The magnitude of the compression force 241 may be directly proportional to or commensurate with the degree of the displacement angle 202. In general, the larger the displacement angle 202, the larger the magnitude of the compression force 241.

Because the rotation member 120 and the pole 130 substantially restrict the longitudinal and lateral movement of the curved plate 110, the compression force 241 may be directed to compress the curved plate 110. As a result of such compression, the curved plate 110 may be adjusted from a pre-compression contour 103 to a post-compression contour 203. The curved plate 110 may be made of an elastic material, such that the curved plate 110 may be adjusted from a pre-compression contour 103 to a post-compression contour 203 without incurring any structure damage thereto.

The post-compression contour 203 may have a different curvature ratio from the pre-compression contour 103. In one embodiment, for example, the post-compression contour 203 may have an adjusted curvature height 214, which may be less than the pre-adjusted curvature height 114. In another embodiment, for example, the post-compression contour 203 may have an adjusted curvature width 215, which may be greater than the pre-adjusted curvature width 115.

The increased adjusted curvature width 215 may stretch the first arm 122 and the second arm 124 of the rotation member 120. Such a stretch may result in a first stretching force 223 along the first arm 122 and a second stretching force 225 along the second arm 124. Responding to the first stretching force 223, the first adjustable segment 123 may extend the length of the first arm 122. Similarly, responding to the second stretching force 225, the second adjustable segment 125 may extend the length of the second arm 124.

The post-compression contour 203 may define an adjusted curvature 211, which may in turn define an adjusted focal point F1. When compared to the pre-adjusted curvature 111, the adjusted curvature 211 may incur a curvature reduction 217. When compared to the pre-adjusted focal length F0, the adjusted focal length F1 may incur a focal length increment 216. Because of its simplistic structure, the contour adjustor 140 may be relatively easy to manufacture and install. As such, the cost associated with manufacturing and installing the contour adjustor 140 may be relatively low when compared to other contour adjustment apparatuses.

Additionally, the contour adjustment surface 142 of the contour adjustor 140 may cooperate with the rotation member 120 in adjusting the curvature 111 and the focal length F0 of the curved plate 110. More specifically, the rotation forces 224 generated by the rotation member 120 may cooperate with the compression force 241 generated by the contour adjustor 140 in adjusting the curvature 111 and the focal length F0 of the curved plate 110. As a result, the rotation of the curved plate 110 and the focal length adjustment of the curved plate 110 can be performed simultaneously and without requiring any additional control device and/or mechanism.

The contour adjustor 140 may be permanently attached to the pole 130 in one embodiment. Alternatively, the contour adjustor 140 may be removable and replaceable in another embodiment. The contour adjustor 140 may come with various dimensions and various contour adjustment surfaces 142. Hence, persons skilled in the art may select a contour adjustor 140 with the appropriate contour adjustment surface 142 for fine tuning the focal length adjustment result. Advantageously, the adjustable reflector 100 may provide a low-cost and easy-to-operate solution for adjusting the curvature and focal length of the heliostat.

Although the contour adjustor 140 as shown in FIG. 1 is stationary, the contour adjustor 140 may be adjusted to one or more relative positions according to various alternative embodiments. The discussion now turns to these alternative embodiments of the adjustable reflector 100.

Figure 3:
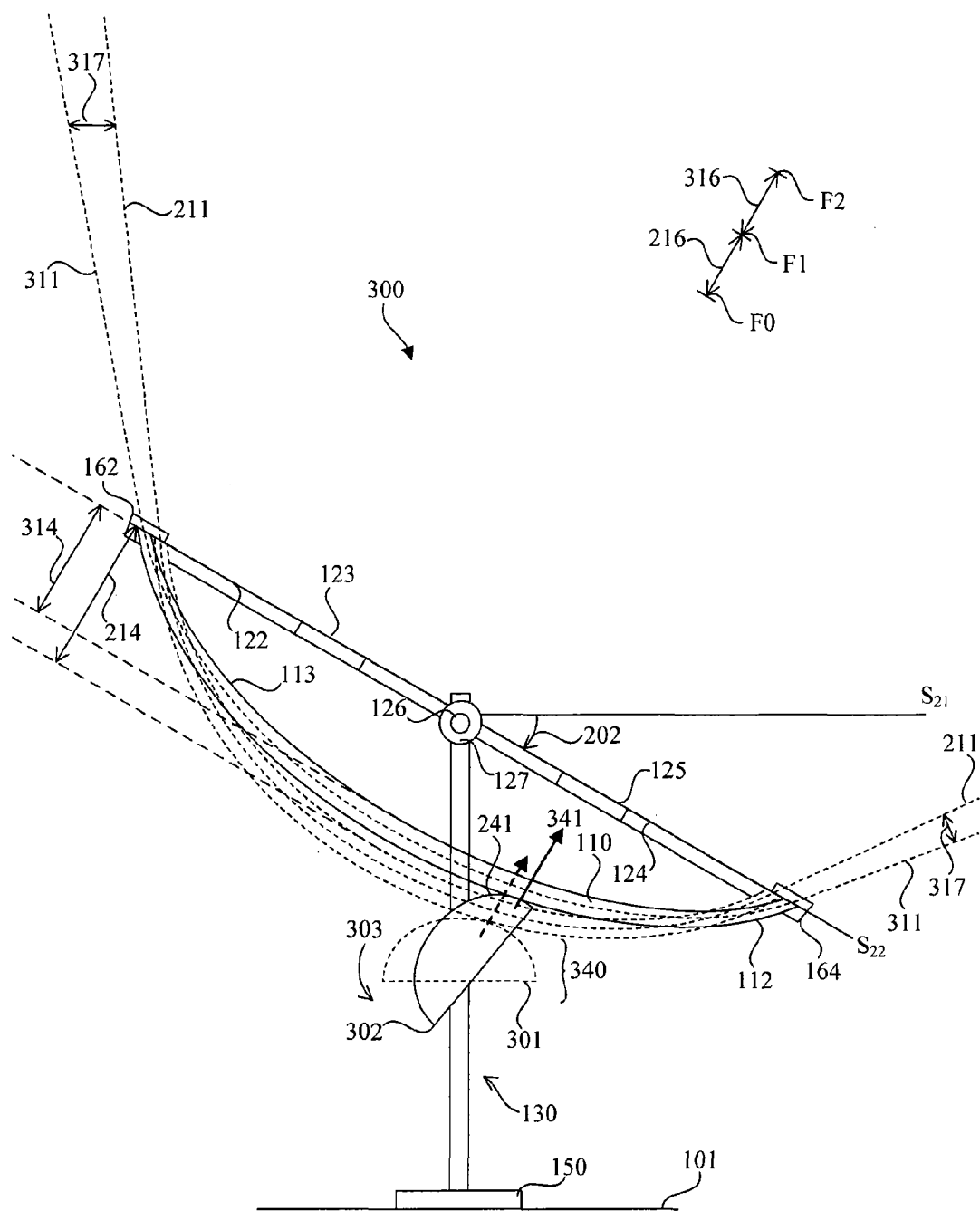
FIG. 3 shows a cross-sectional view of an alternative adjustable reflector at an angular position according to an alternative embodiment of the present invention.

FIG. 3 shows a cross-sectional view of an alternative adjustable reflector 300 according to an alternative embodiment of the present invention. The alternative adjustable reflector 300 may include many structural and functional features of the adjustable reflector 100. For example, the alternative adjustable reflector 300 may include the curved plate 110, the rotation member 120, and the pole 130. However, the contour adjustor 140 may be replaced by a rotatable contour adjustor 340.

The rotatable contour adjustor 340 may have a range of rotation 303 about an axis that is parallel to and vertically aligned with, the axis $A_y$. The range of rotation 303 may allow the rotatable contour adjustor 340 to have one or more angular positions when the curved plate 110 is at a particular angular position. For example, when the curved plate 110 is angularly displaced by a displacement angle 202, the rotatable contour adjustor 340 may rotate from an initial position 301 to a rotated position 302.

Because of the multiple angular positions, the rotatable contour adjustor 340 may assert compression forces with various magnitudes against the convex surface 112 of the curved plate 110. At the initial position 301, the rotatable contour adjustor 340 may assert the first compression force 241 against the convex surface 112 of the curved plate 110. The first compression force 241 may reform the contour of the curved plate 110 such that the curved plate 110 may have a first adjusted curvature 211 and a first adjusted focal length F1. This adjustment process is similar to the one discussed for FIG. 2.

At the rotated position 302, the rotatable contour adjustor 340 may assert a second compression force 341 against the convex surface 112 of the curved plate 110. Because the rotated position 302 allows the rotatable contour adjustor 340 to further protrude into a space that is previously occupied by the curved plate 110, the second compression force 341 may be greater than the first compression force 241. However, if the rotated position 302 is directed towards an opposition direction (e.g., the clockwise direction), it may cause the rotatable contour adjustor 340 to concede a space to the curved plate 110. As such, the second compression force 341 may be less than the first compression force 241.

For illustrative purpose, the rotated position 302 is a result of a counter-clockwise angular movement. Thus, the second compression force 341 may be greater than the first compression force 241, and the contour of the curved plate 110 may be further compressed. After the further compression, the curved plate 110 may have a second adjusted curvature 311 and a second adjusted focal length F2. The second adjusted curvature 311 may have a second adjusted curvature height 314, which may be less than the first adjusted curvature height 214. As a result, the second adjusted curvature 311 may have a second curvature reduction 317 when compared to the first adjusted curvature 211, and the second adjusted focal length F2 may have a second focal length increment 316 when compared to the first adjusted focal length F1.

Although FIG. 3 shows that the range of rotation 303 may lead to a curvature reduction and a focal length increment, these adjustment results may be reversed if the direction of rotation is reversed. In such manner, the rotatable contour adjustor 340 may facilitate the fine tuning of the curvature 111 of the curved plate 110. Such fine tuning can be advantageous because it may provide the alternative adjustable reflector 300 with a range of adjustable focal lengths when the curved plated 110 is at a particular angular position.

Figure 4:
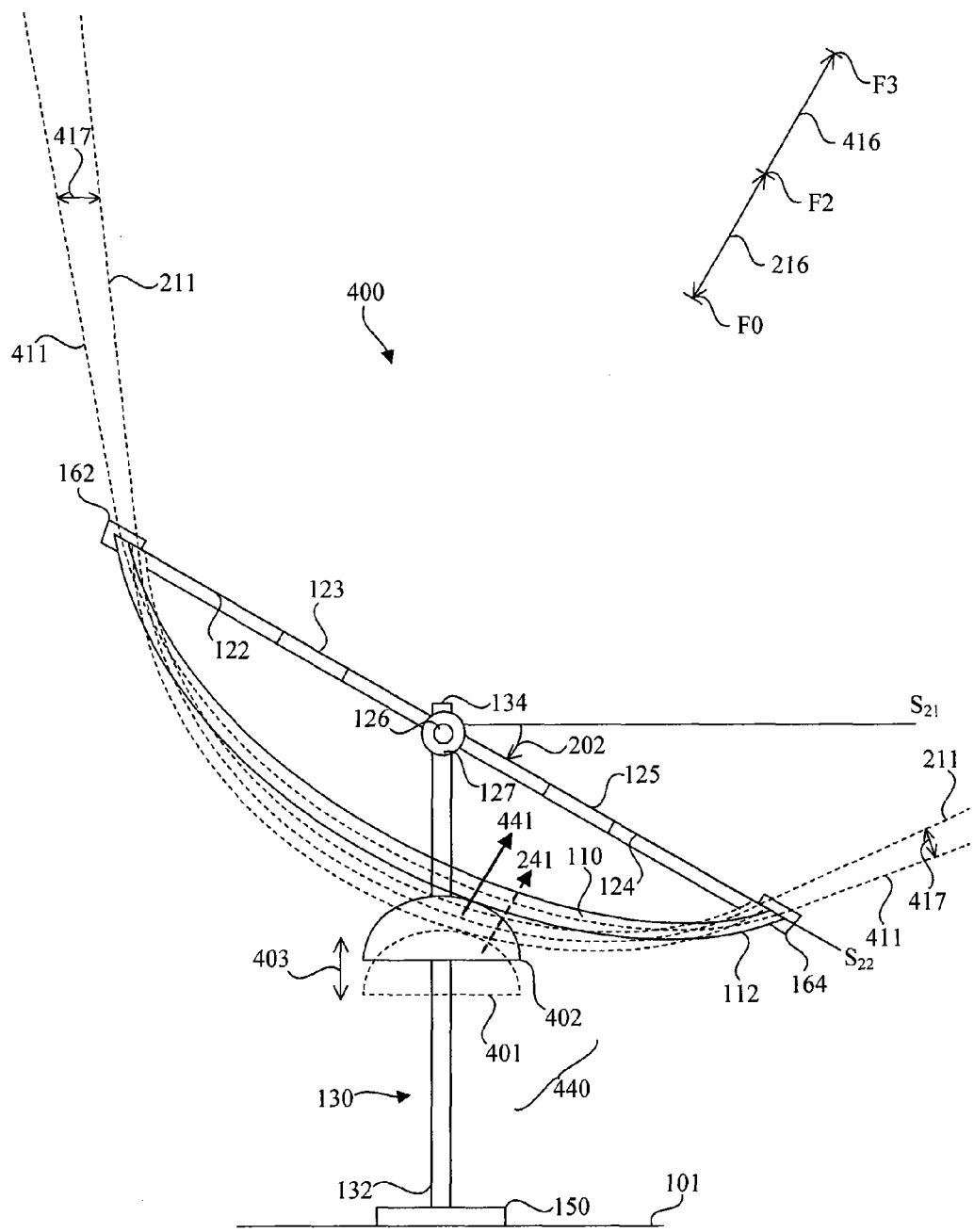
FIG. 4 shows a cross-sectional view of an alternative adjustable reflector at an angular position according to an alternative embodiment of the present invention.

FIG. 4 shows a cross-sectional view of another alternative adjustable reflector 400 according to another alternative embodiment of the present invention. The alternative adjustable reflector 400 may include many structural and functional features of the adjustable reflector 100. For example, the alternative adjustable reflector 400 may include the curved plate 110, the rotation member 120, and the pole 130. However, the contour adjustor 140 may be replaced by a travel contour adjustor 440.

The travel contour adjustor 440 may have a range of longitudinal movement 403 along the pole 130. The range of longitudinal movement 403 may allow the travel contour adjustor 440 to have one or more longitudinal positions when the curved plate 110 is at a particular angular position. For example, when the curved plate 110 has a displacement angle 202, the travel contour adjustor 440 may travel from an initial longitudinal position 401 to an adjusted longitudinal position 402.

Because of the multiple longitudinal positions, the travel contour adjustor 440 may assert compression forces with various magnitudes against the convex surface 112 of the curved plate 110. At the initial longitudinal position 401, the travel contour adjustor 440 may assert the first compression force 241 against the convex surface 112 of the curved plate 110. The first compression force 241 may reform the contour of the curved plate 110 such that the curved plate 110 may have a first adjusted curvature 211 and a first adjusted focal length F1. This adjustment process is similar to the one discussed in FIG. 2.

At the adjusted longitudinal position 402, the travel contour adjustor 440 may assert a third compression force 441 against the convex surface 112 of the curved plate 110. Because the adjusted longitudinal position 402 allow the rotatable contour adjustor 340 to further protrude into a space that is previously occupied by the curved plate 110, the third compression force 441 may be greater than the first compression force 241. However, if the adjusted longitudinal position 402 is directed towards an opposition direction (e.g., the downward direction), it may cause the travel contour adjustor 440 to concede a space to the curved plate 110. As such, the third compression force 441 may be less than the first compression force 241.

For illustrative purpose, the adjusted longitudinal position 402 is the result of an upward longitudinal movement. Thus, the third compression force 441 may be greater than the first compression force 241, and the contour of the curved plate 110 may be further compressed. After further compression, the curved plate 110 may have a third adjusted curvature 411 and a third adjusted focal length F3. The third adjusted curvature 411 may have a third curvature reduction 417 when compared to the first adjusted curvature 211, and the third adjusted focal length F3 may have a third focal length increment 416 when compared to the first adjusted focal length F1.

Although FIG. 4 shows that the range of longitudinal movement 403 may cause a curvature reduction and a focal length increment, these adjustment results may be reversed if the direction of the longitudinal movement is reversed. In such manner, the travel contour adjustor 440 may facilitate the fine tuning of the curvature 111 of the curved plate 110. Such fine tuning can be advantageous because it may provide the alternative adjustable reflector 400 with a range of adjustable focal lengths when the curved plated 110 is at a particular angular position.

FIGS. 3 and 4 show that the structural and functional features of the rotatable contour adjustor 340 and the travel contour adjustor 440 are implemented separately in two alternative adjustable reflectors (e.g., the alternative adjustable reflector 300 and the alternative adjustable reflector 400). However, according to various embodiments, the structural and functional features of the rotatable contour adjustor 340 and of the travel contour adjustor 440 may be jointly implemented in a single adjustable reflector.

Figure 5:
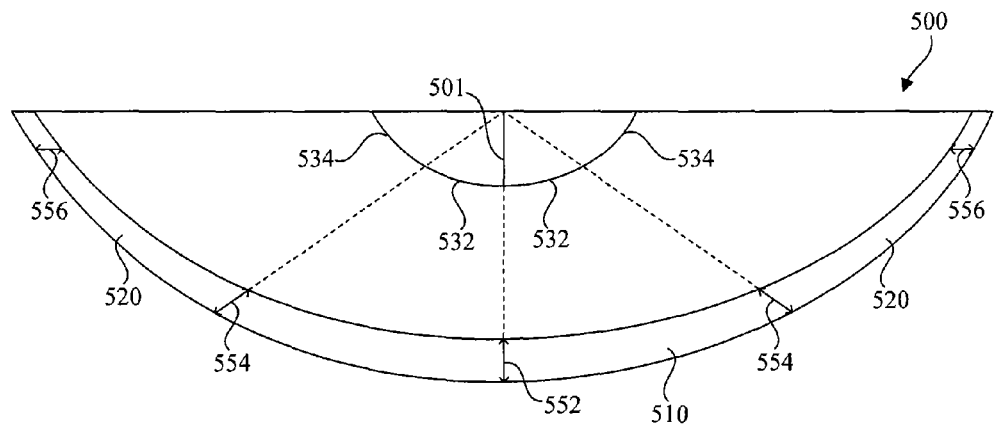
FIG. 5 shows a cross-sectional view of a parabolic plate according to an embodiment of the present invention.

The discussion now turns to various parabolic plates, each of which may be used as the curved plate 110 of the previously shown adjustable reflectors (e.g., the adjustable reflectors 100, the alternative adjustable reflectors 200, and/or the alternative adjustable reflectors 300). FIG. 5 shows a cross-sectional view of a parabolic plate 500 according to an embodiment of the present invention. The parabolic plate 500 may include a center section 510 and a peripheral section 520. The boundary of the center section 510 may be defined by a pair of base angles 532 springing from a line of symmetry 501 of the parabolic plate 500.

The peripheral section 520 may surround the center section 510. As such, the boundary of the peripheral section 520 may be defined by a pair of peripheral angles 534 measured from the displacement plane of the parabolic plate 500. Because the sum of one base angle 532 and one peripheral angle 534 may be substantially equal to 90 degrees, the peripheral angle 534 may be a function of the base angle 532. Accordingly, the boundary of the peripheral section 520 may also be defined by the base angle 532.

In one embodiment, for example, the base angle 532 may range from about 15 degrees to about 75 degrees. In another embodiment, for example, the base angle 532 may range from about 30 degrees to about 60 degrees. In yet another embodiment, for example, the base angle 532 may be about 45 degrees.

The parabolic plate 500 may have a thickness gradation. In general, the thickness of the parabolic plate 500 may increase from the top edge towards the bottom center. The parabolic plate 500 may have a first thickness 552 around the bottom center of the center section 510, a second thickness 554 at the junction between the center section 510 and the peripheral section 520, and a third thickness 556 around the top edge of the peripheral section 520. The third thickness 556 may increase gradually to reach the second thickness 554, whereas the second thickness 554 may increase gradually to reach the first thickness 552.

The thickness gradation may facilitate the redirection of stress caused by one or more compression forces. The compression forces may be applied more frequently and with greater magnitude around the center section 510 of the parabolic plate 500. Such frequent and heavy application of compression forces may deform the parabolic contour of the parabolic plate 500. Such deformation may include but is not limited to the introduction of sinusoidal contour and/or other irregular contours to the parabolic plate 500.

Although it may be desirable to use the compression force to reform and/or adjust the parabolic contour of the parabolic plate 500, it may be less desirable to deform the parabolic contour because doing so may cause the parabolic plate 500 to suffer from focal length divergence. In order to prevent the deformation of the parabolic contour, it may be desirable to fortify the rigidity of the center section 510. The thickness gradation structure of the parabolic plate 500 may offer such fortification.

Figure 6:
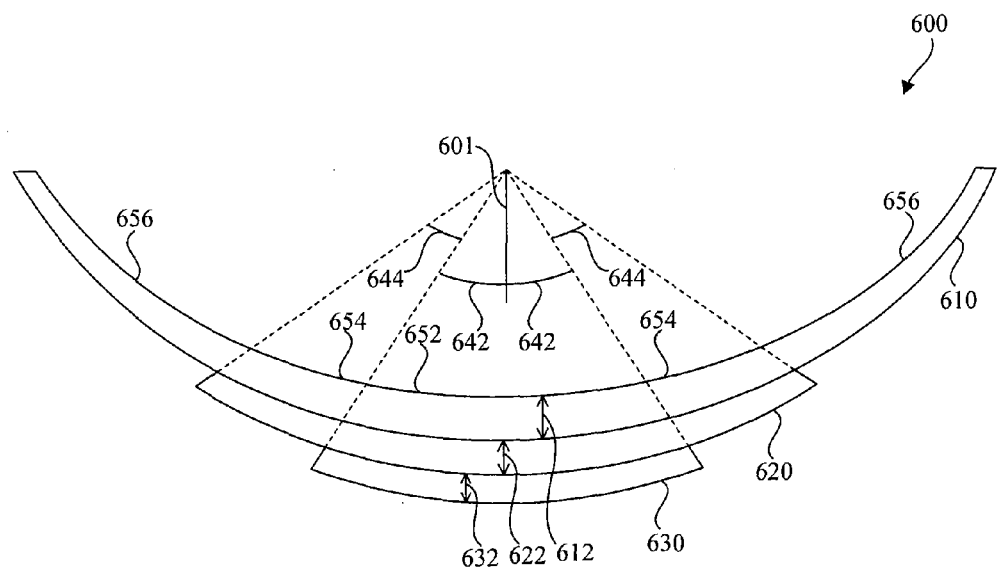
FIG. 6 shows a cross-sectional view of an alternative parabolic plate according to an alternative embodiment of the present invention.

FIG. 6 shows a cross-sectional view of an alternative parabolic plate 600 according to an alternative embodiment of the present invention. The implementation concept of the alternative parabolic plate 600 is similar to that of the parabolic plate 500. That is, the alternative parabolic plate 600 may provide fortification to the section that is more susceptible to contour deformation. However, instead of having a single thickness gradation layer, the alternative parabolic plate 600 may include multiple layers to implement the concept of thickness gradation.

In one embodiment, for example, the alternative parabolic plate 600 may include a first layer 610, a second layer 620, and a third layer 630. The first layer 610 may have a first thickness 612. The second layer 620 may have a second thickness 622, which may be less than the first thickness 612. The third layer 630 may have a third thickness 632, which may be less than the second thickness 622. The first layer 610, the second layer 620, and the third layer 630 may overlap with one another around a center region 652. The first layer 610 and the second layer 620 may overlap with each other around a transition region 654, which may surround the center region 652. The non-overlapped portion of the first layer 610 may form a peripheral region 656, which may surround the transition region 654.

The boundary of the center region 652 may be defined by a pair of base angles 642 springing from a line of symmetry 601 of the alternative parabolic plate 600. In one embodiment, for example, the base angle 642 may range from about 15 degrees to about 60 degrees. In another embodiment, for example, the base angle 642 may range from about 15 degrees to about 45 degrees. In yet another embodiment, for example, the base angle 642 may range from about 15 degrees to about 30 degrees.

The boundary of the transition region 654 may be defined by a pair of transition angles 644 measured from the pair of base angles 642. In one embodiment, for example, the transition angle 644 may range from about 5 degrees to about 30 degrees. In another embodiment, for example, the transition angle 644 may range from about 5 degrees to about 20 degrees. In yet embodiment, for example, the transition angle 644 may range from about 5 degrees to about 15 degrees.

As a result of the various thicknesses of the various layers, the alternative parabolic plate 600 may achieve a thickness gradation. Accordingly, the center region 652 may have the greatest thickness and rigidity while the transition region 654 and the peripheral region 656 may remain relatively flexible. Detail information regarding the alternative parabolic plate 600 can be found in co-pending U.S. patent application Ser. No. 13/028,941, entitled "LOW COST PARABOLIC SOLAR CONCENTRATOR AND METHOD TO DEVELOP THE SAME," filed on Feb. 16, 2011. The entirety of this co-pending application is incorporated herein by reference.

Figure 7:
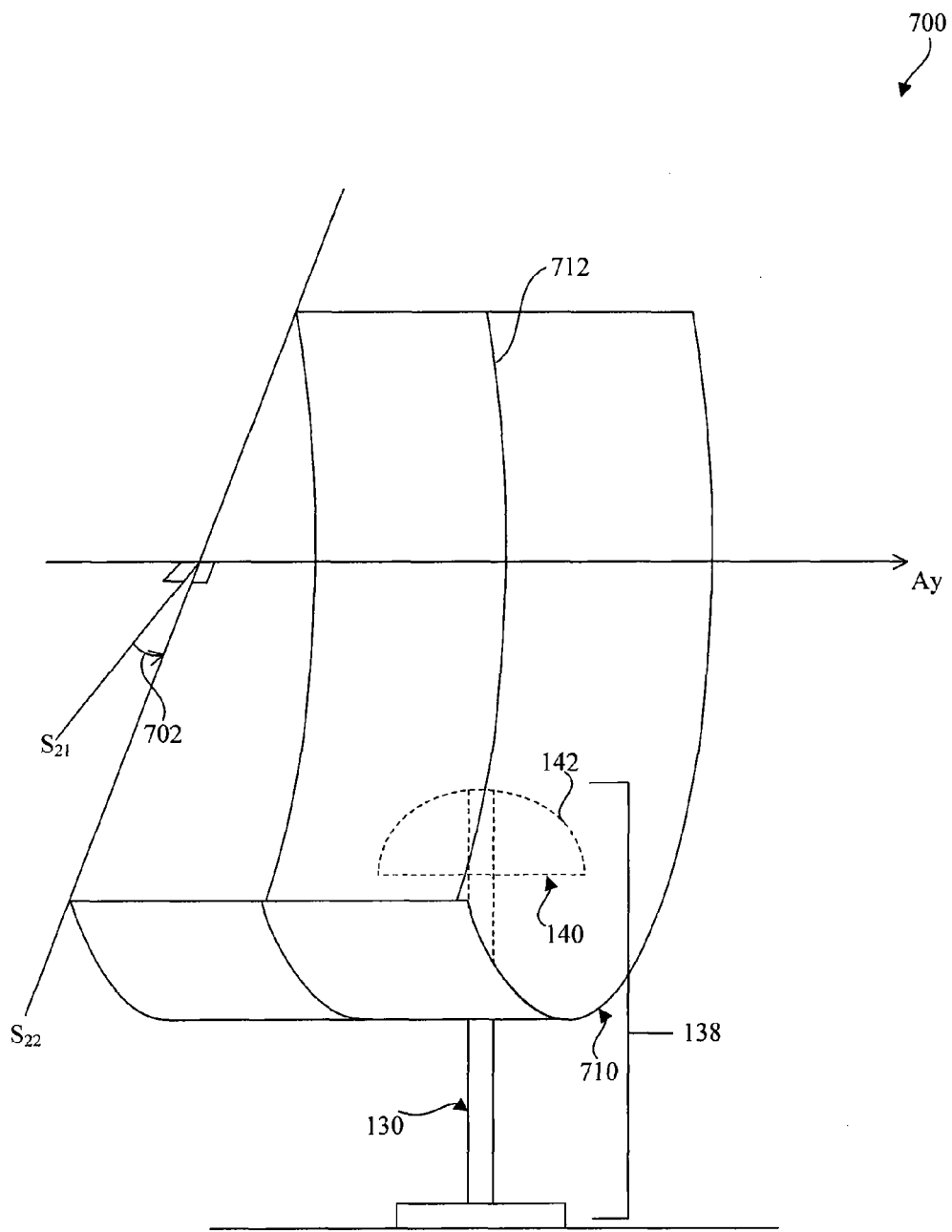
FIG. 7 shows a perspective view of an adjustable reflector with a single-axis parabolic plate according to an embodiment of the present invention.

FIG. 7 shows a perspective view of an adjustable reflector 700 with a single-axis parabolic plate 710 according to an embodiment of the present invention. In general, the adjustable reflector 700 may include similar functional and structural features as the previously discussed adjustable reflectors (e.g., the adjustable reflectors 100, the alternative adjustable reflectors 200, and/or the alternative adjustable reflectors 300). For example, the adjustable reflector 700 may include the contour shaft 138 and the rotation member 120, which is not shown in FIG. 7 for the sake of clarity and simplicity. The contour shaft 138 may include the pole 130 and the contour adjustor 140.

The contour adjustor 140 may have the contour adjustment surface 142 for asserting the compression force against the concave surface of the single-axis parabolic plate 710. Moreover, the contour adjustor 140 may be interchangeable with the rotatable contour adjustor 340 and the travel contour adjustor 440 according to various embodiments.

The single-axis parabolic plate 710 may have an edge defining various shapes. In one embodiment, for example, the single-axis parabolic plate 710 may be a rectangular parabolic plate, which may have a curvature 712 that is partially circumscribing the single axis $A_Y$. When the reference plane S22 forms a displacement angle 702 with the reference plane S21, the contour adjustor 140 may assert the compression force for changing the curvature 712 of the single-axis parabolic plate 710. Because the curvature 712 is defined by a single axis $A_Y$, the contour adjustor 140 may reform the curvature 712 in a relatively uniform manner.

Figure 8:
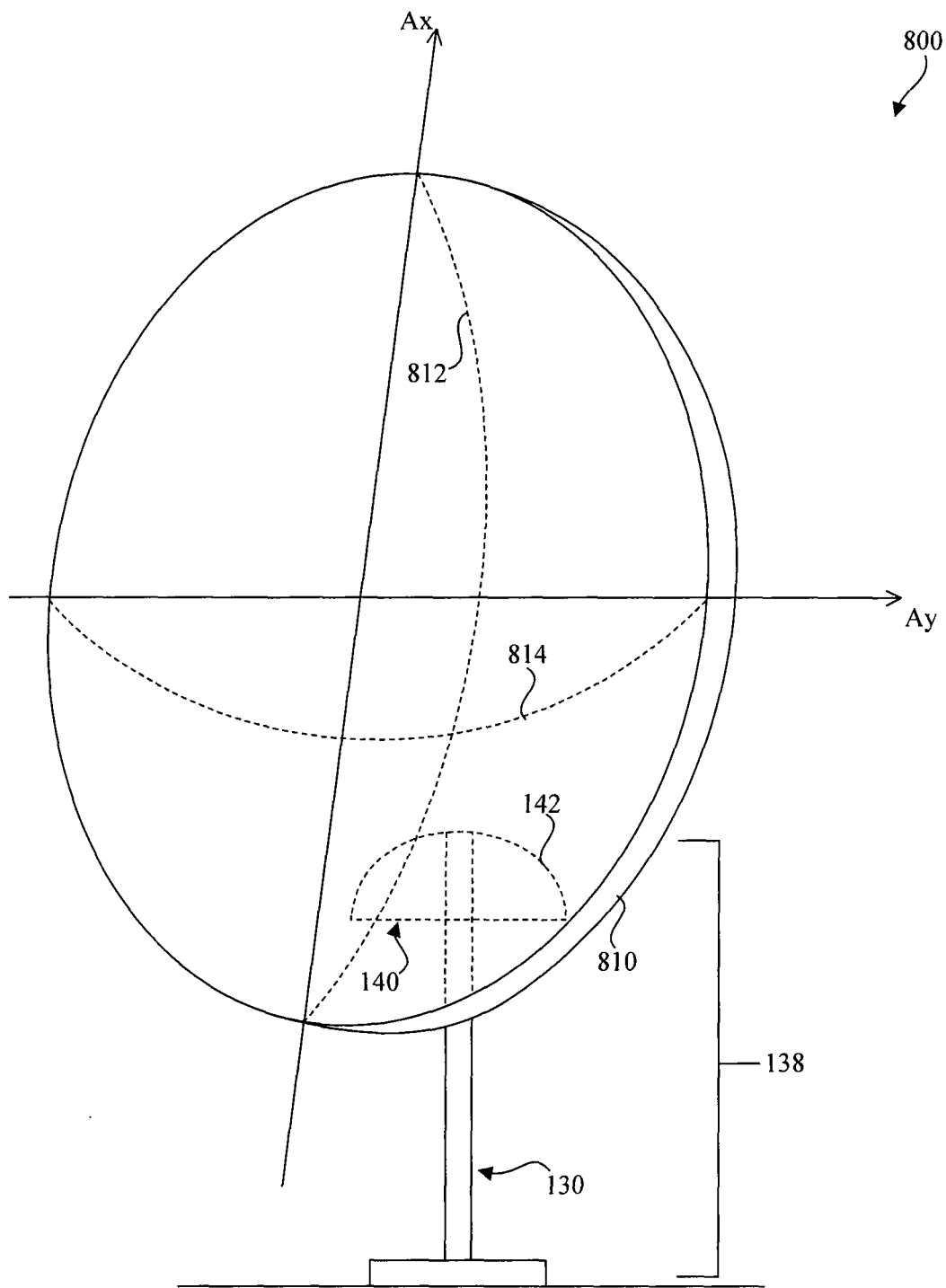
FIG. 8 shows a perspective view of an adjustable reflector with a multiple-axis parabolic plate according to an embodiment of the present invention.

FIG. 8 shows a perspective view of an adjustable reflector 800 with a multiple-axis parabolic plate 810 according to an embodiment of the present invention. In general, the adjustable reflector 800 may include similar functional and structural features as the previously discussed adjustable reflectors (e.g., the adjustable reflectors 100, the alternative adjustable reflectors 200, and/or the alternative adjustable reflectors 300). For example, the adjustable reflector 800 may include the contour shaft 138 and the rotation member 120, which is not shown in FIG. 8 for the sake of clarity and simplicity. The contour shaft 138 may include the pole 130 and the contour adjustor 140.

The contour adjustor 140 may have the contour adjustment surface 142 for asserting the compression force against the concave surface of the multiple-axis parabolic plate 810. Moreover, the contour adjustor 140 may be interchangeable with the rotatable contour adjustor 340 and the travel contour adjustor 440 according to various embodiments.

The multiple-axis parabolic plate 810 may have an edge defining various shapes. In one embodiment, for example, the multiple-axis parabolic plate 810 may be a circular parabolic plate. The multiple-axis parabolic plate 810 may have a plurality of curvatures, which may include but is not limited to a pair of orthogonal curvatures, such as a first curvature 812 and a second curvature 814. The first curvature 812 may partially circumscribe the axis $A_Y$, while the second curvature 814 may partially circumscribe the axis $A_X$. As shown in FIG. 8, the axis $A_X$ may be orthogonal to the axis $A_Y$.

In one embodiment, the contour adjustor 140 may assert a first compression force for changing primarily the first curvature 812 when the multiple-axis parabolic plate 810 is rotated about the axis $A_Y$. In another embodiment, the contour adjustor 140 may assert a second compression force for changing primarily the second curvature 814 when the multiple-axis parabolic plate 810 is rotated about the axis $A_X$. In yet another embodiment, when the multiple-axis parabolic plate 810 is rotated simultaneously about the axis $A_Y$ and the axis $A_X$, the contour adjustor 140 may assert a third compression force for simultaneously changing the first curvature 812 and the second curvature 814.

Because the first curvature 812 and the second curvature 814 are confined within the multiple-axis parabolic plate 810, the first curvature 812 and the second curvature 814 may have an interdependent relationship. Due to this interdependent relationship, the contour adjustor 140 may introduce minor adjustment to the second curvature 814 while performing a primary adjustment for the first curvature 812. Similarly, the contour adjustor 140 may introduce minor adjustment to the first curvature 812 while performing a primary adjustment for the second curvature 814.

As discussed so far in FIGS. 1-4, the adjustable reflectors (e.g., the adjustable reflectors 100, the alternative adjustable reflectors 200, and/or the alternative adjustable reflectors 300) may integrate the rotation member 120 with the contour shaft 138. However, according to various embodiments, one or more alternative rotation members may be installed separately from the contour shaft 138.

Figure 9:
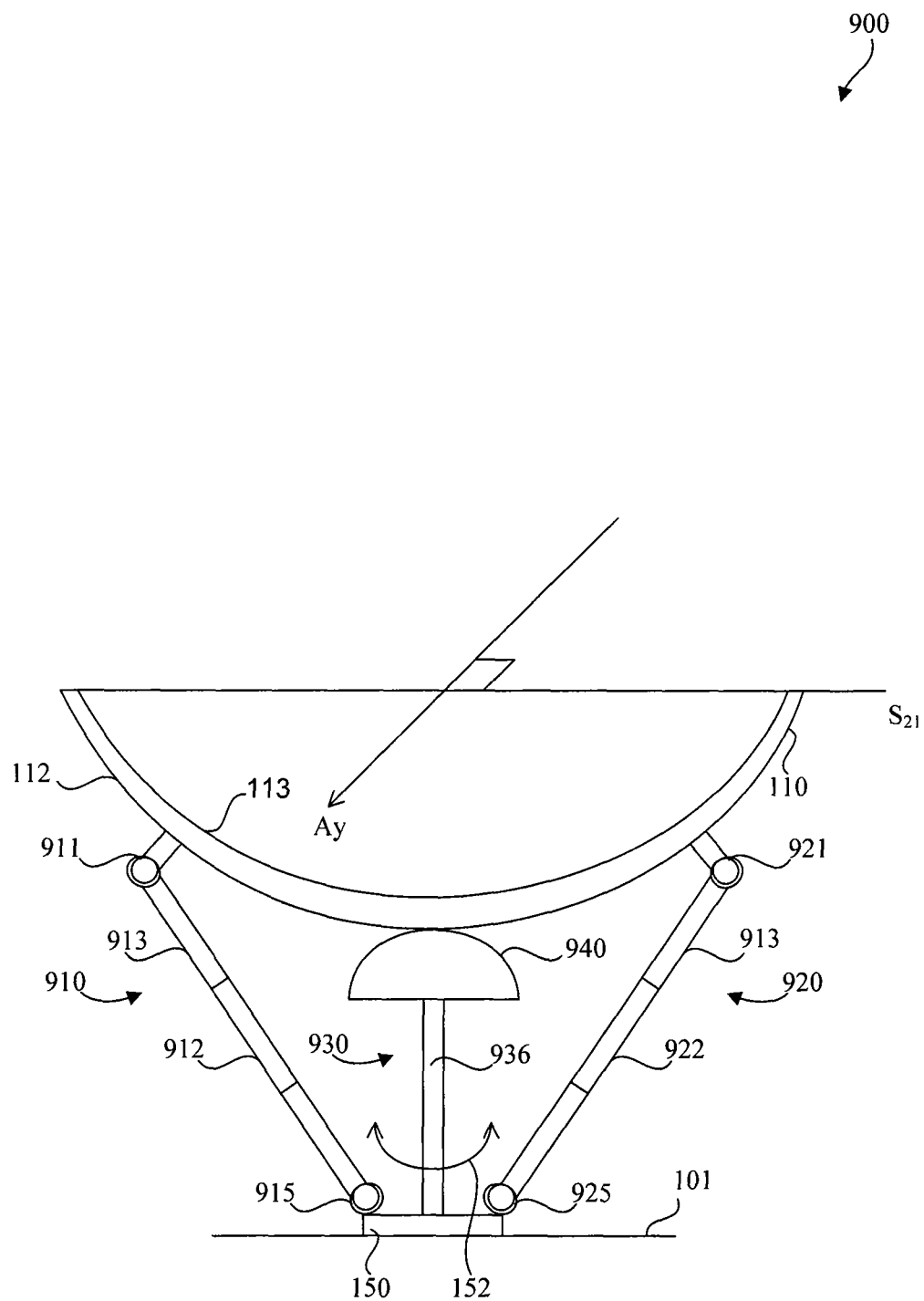
FIG. 9 shows a cross-sectional view of an alternative adjustable reflector according to an alternative embodiment of the present invention.

For example, as shown in FIG. 9, an alternative adjustable reflector 900 may include a first rotation member 910, a second rotation member 920, a contour shaft 930, and a curved plate 110. As previously discussed, the curved plate 110 may be implemented by one of the parabolic plates (e.g., the parabolic plate 500, the alternative parabolic plate 600, the single-axis parabolic plate 710, and the multiple-axis parabolic plate 810) as shown in FIGS. 5-8.

Similar to the contour shaft 138 as shown in FIG. 1, the contour shaft 930 may include a pole 936 and a contour adjustor 940. The pole 936 may have a first end mounted to the rigid surface 101, and a second end for connecting the contour adjustor 940. The contour adjustor 940 may be implemented by one of the previously discussed contour adjustors (e.g., the contour adjustor 140, the rotatable contour adjustor 340, or the travel contour adjustor 440), or combinations thereof. Accordingly, the contour adjustor 940 may provide similar functional features as the previously discussed contour adjustors (e.g., the contour adjustor 140, the rotatable contour adjustor 340, and/or the travel contour adjustor 440).

Unlike the rotation member 120 of the adjustable reflector 100, the first rotation member 910 and the second rotation member 920 may be installed and/or operated independent of the contour shaft 930. The first rotation member (or the first rotation arm) 910 may include a first top hinge 911, a first actuator 912, a first arm 913, and a first bottom hinge 915. The first top hinge 911 may connect the first arm 913 to the convex surface 112 of the curved plate 110, thereby providing a pivot point between the first arm 913 and the curved plate 110. The first bottom hinge 915 may connect the first arm 913 to the rotary base 150, thereby providing a pivot point between the first arm 913 and the rotary base 150.

The second rotation member (or the second rotation arm) 920 may include a second top hinge 921, a second actuator 922, a second arm 923, and a second bottom hinge 925. The second top hinge 921 may connect the second arm 923 to the convex surface 112 of the curved plate 110, thereby providing a pivot point between the first arm 913 and the curved plate 110. The second bottom hinge 925 may connect the second arm 923 to the rotary base 150, thereby providing a pivot point between the second arm 923 and the rotary base 150. When the rotary base 150 generate the second rotation 152 about an axis defined by the pole 936, the first rotation member 910 and the second rotation member 920 may rotate the curved plate 110 according to the second rotation 152.

The first actuator 912 may generate a longitudinal movement along the first arm 913, which may cause the first arm 913 to extend and retract longitudinally. Similarly, the second actuator 922 may generate a longitudinal movement along the second arm 923, which may cause the second arm 923 to extend and retract longitudinally. In such manner, the first actuator 912 and the second actuator 922 may cooperate to generate an angular displacement of the curved plate 110 while preventing the curved plate 110 from having any lateral and/or longitudinal displacement. As a result, the curved plate 110 may be rotated about the axis $A_Y$.

In rotating the curved plate 110 in a clockwise direction, the first actuator 912 may extend the first arm 913, while the second actuator 922 may retract the second arm 923. In rotating the curved plate 110 in a counter-clockwise direction, the first actuator 912 may retract the first arm 913, while the second actuator 922 may extend the second arm 923. Because the curved plate 110 is rotated about the axis AY with substantially no to very little lateral or longitudinal movement, the contour adjustor 940 may cooperate with the first and second actuators 912 and 922 in adjusting the curvature and the focal length of the curved plate 110.

Although FIG. 9 shows that two rotation members (e.g., the first rotation member 910 and the second rotation member 920) are used for rotating the curved plate 110 along the axis $A_Y$, the alternative adjustable reflector 900 may include other numbers of rotation members. In one embodiment, for example, the alternative adjustable reflector 900 may include four rotation members, which may be divided into two orthogonal groups. Each group of rotation members may be responsible for rotating the curved plate 110 in a direction that is orthogonal to the rotation generated by the other pair of rotation members.

In another embodiment, for example, the alternative adjustable reflector 900 may include only the first rotation member 910 and replace the second rotation member 920 with a passive hinge (not shown) that may guide the rotation of the curved plate 110. In yet another embodiment, for example, the alternative adjustable reflector 900 may include only the second rotation member 920 and replace the first rotation member 910 with a passive hinge (not shown) that may guide the rotation of the curved plate 110. The passive hinge may be positioned around the axis $A_y$, and it may be connected to the concave surface 113 of the curved plate 110. Accordingly, the passive hinge may provide a pivot point for the curved plate 110, so as to allow the actuator (e.g., the first actuator 912 or the second actuator 922) to rotate the curved plate 110 without laterally or longitudinally displacing the curved plate.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An adjustable reflector, comprising:
   a curved plate having a convex side;
   a rotation member configured to engage the curved plate, and configured to rotate the curved plate about an axis and to an angular position; and
   a contour adjustor having a convex adjustment surface configured to contact the curved plate at a contact location on the convex side of the curved plate and assert a compression force against the curved plate at the contact location, the rotation member configured to vary in length such that the variation in length along with the compression force asserted by the contour adjustor adjust a curvature of the curved plate according to the angular position of the curved plate.

2. The adjustable reflector of claim 1, wherein the curved plate is a parabolic plate further having a concave surface for directing an incident wave to a focal point.

3. The adjustable reflector of claim 1, wherein:
   the convex adjustment surface of the contour adjustor is configured to direct a first force against the convex surface of the curved plate,
   the rotation member is configured to direct a second force against the curved plate, and
   the first force cooperates with the second force to reduce the curvature of the curved plate.

4. The adjustable reflector of claim 3, wherein:
   the first force has a magnitude directly proportional to an angular displacement between the angular position and an initial position, and
   the curvature of the curved plate is inversely proportional to the magnitude of the first force.

5. The adjustable reflector of claim 1, further comprising:
   an arm connected to the convex side of the curved plate, the arm configured to engage and the curved plate and rotate the curved plate about the axis.

6. The adjustable reflector of claim 1, wherein the curved plate includes:
   a center section having a first thickness, and
   a peripheral section surrounding the center section, and having a second thickness less than the first thickness.

7. The adjustable reflector of claim 1, wherein the curved plate is a parabolic plate selected from a group consisting of a single-axis parabolic plate, a multiple-axis parabolic plate, a circular parabolic plate, a rectangular parabolic plate, and combinations thereof.

8. The adjustable reflector of claim 1, wherein the contour adjustor is stationary relative to the axis.

9. The adjustable reflector of claim 1, wherein the contour adjustor has a longitudinal movement along a direction substantially perpendicular to the axis.

10. An adjustable reflector for directing energy to a receiver, the adjustable reflector comprising:
    a parabolic plate having a convex side, a focal length and an edge defining a first plane;
    a rotation member defining a second plane, the rotation member engaging the parabolic plate, and configured to angularly displace the parabolic plate, such that the first plane forms an angle with the second plane; and
    a contour shaft positioned substantially perpendicular to the second plane, and having a convex adjustment surface configured to contact the parabolic plate at a contact location on the convex side of the parabolic plate, the contour shaft configured to assert a compression force against the parabolic plate at the contact location, the rotation member configured to vary in length such that the variation in length along with the compression force asserted by the contour shaft adjust the focal length of the parabolic plate according to the angle between the first plane and the second plane.

11. The adjustable reflector of claim 10, wherein:
    the rotation member is configured to direct a rotation force against the parabolic plate, and the compression force along with the rotation force increase the focal length of the parabolic plate.

12. The adjustable reflector of claim 11, wherein:
    the convex adjustment surface of the contour shaft has a plurality of angular positions, and
    the convex adjustment surface of the contour shaft is configured to direct the compression force having a plurality of magnitudes, each corresponding to one of the plurality of angular positions.

13. The adjustable reflector of claim 10, wherein the compression force has a magnitude directly proportional to the angle between the first plane and the second plane.

14. The adjustable reflector of claim 10, wherein the compression force has a magnitude inversely proportional to an adjustable distance between the second plane and the convex adjustment surface of the contour shaft.

15. The adjustable reflector of claim 10, wherein the parabolic plate is selected from a group consisting of a single-axis parabolic plate, a multiple-axis parabolic plate, a circular parabolic plate, a rectangular parabolic plate, and combinations thereof.

16. The adjustable reflector of claim 10, wherein the parabolic plate includes:
    a center section having a first thickness, and
    a peripheral section surrounding the center section and having a second thickness less than the first thickness.

17. A heliostat for directing solar energy to a tower receiver, the heliostat comprising:
    a pole having a first end mounted to a rigid surface, a second end opposing the first end, and a middle segment positioned between the first end and the second end;
    a hinge positioned at the second end of the pole, and defining an axis substantially perpendicular to the pole;
    a parabolic dish having a concave surface and a convex surface defining a curvature therebetween, the parabolic dish configured to engage the hinge for rotating about the axis;
    a rotation member configured to engage the parabolic dish, and configured to rotate the parabolic dish about the axis and to form a displacement angle with a reference plane substantially perpendicular to the pole; and a contour adjustor having a convex adjustment surface positioned along the middle segment of the pole and configured to contact the parabolic dish at a contact location on the convex surface of the parabolic dish and direct a compression force against the parabolic dish at the contact location, wherein the rotation member is configured to vary in length such that the variation in length along with the compression force directed by the contour adjustor adjust the curvature of the curved plate based on the displacement angle.

18. The heliostat of claim 17, wherein:
the hinge is configured to direct a reaction force against the concave surface of the parabolic dish in reaction to the compression force,
wherein the compression force along with the reaction force reduce the curvature of the parabolic dish.

19. The heliostat of claim 17, wherein the contour adjustor is stationary relative to the hinge.

\* \* \* \* \*